United States Patent
Albrecht

(10) Patent No.: US 9,906,498 B2
(45) Date of Patent: Feb. 27, 2018

(54) METHOD FOR SETTING UP A SECURE COMMUNICATION CONNECTION, A COMMUNICATION DEVICE AND CONNECTION CONTROLLER

(71) Applicant: Siemens Aktiengesellschaft, Munich (DE)

(72) Inventor: Harald Albrecht, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 248 days.

(21) Appl. No.: 14/839,069

(22) Filed: Aug. 28, 2015

(65) Prior Publication Data
US 2016/0197881 A1 Jul. 7, 2016

(30) Foreign Application Priority Data
Sep. 23, 2014 (EP) .................................. 14185907

(51) Int. Cl.
| | |
|---|---|
| H04L 29/06 | (2006.01) |
| G05B 19/418 | (2006.01) |
| H04L 29/08 | (2006.01) |
| H04L 29/12 | (2006.01) |

(52) U.S. Cl.
CPC ...... H04L 63/029 (2013.01); G05B 19/41855 (2013.01); H04L 63/0272 (2013.01); H04L 65/1069 (2013.01); H04L 67/12 (2013.01); H04L 61/2076 (2013.01); H04L 61/6059 (2013.01)

(58) Field of Classification Search
None
See application file for complete search history.

(56) References Cited

U.S. PATENT DOCUMENTS

| | | | | |
|---|---|---|---|---|
| 7,620,979 | B2 * | 11/2009 | Hippelainen | ..... H04L 29/12009 709/227 |
| 2004/0136382 | A1 | 7/2004 | Sundquist | |
| 2005/0066041 | A1 | 3/2005 | Chin et al. | |
| 2007/0073850 | A1 * | 3/2007 | Callaghan | .............. G05B 19/05 709/220 |
| 2007/0091846 | A1 * | 4/2007 | Kim | ................. H04W 36/0033 370/331 |

(Continued)

FOREIGN PATENT DOCUMENTS

EP   1 770 458 A2   4/2007

*Primary Examiner* — Michael R Vaughan
(74) *Attorney, Agent, or Firm* — Cozen O'Connor

(57) ABSTRACT

In the case of a secure communication connection to a communication device connected to the industrial automation system via a non-secure subnetwork, a monitoring unit checks whether a new communication network address assigned to the communication device for a connection to the non-secure subnetwork becomes valid. In the event of a change in a communication network address and in the case of a still existing secure communication connection, the monitoring unit transmits an address change notification via the existing secure communication connection, where upon receiving the address change notification, the set-up of an additional secure communication connection and a changeover from the existing secure communication connection to the additional secure communication connection are initiated.

13 Claims, 2 Drawing Sheets

(56) References Cited

U.S. PATENT DOCUMENTS

| | | | |
|---|---|---|---|
| 2007/0204155 A1* | 8/2007 | Dutta | H04L 63/062 713/168 |
| 2008/0310323 A1* | 12/2008 | Shirota | H04L 29/12056 370/254 |
| 2010/0235614 A1 | 9/2010 | Callaghan et al. | |
| 2015/0372823 A1* | 12/2015 | Schmirler | H04L 9/3263 713/156 |
| 2016/0226980 A1* | 8/2016 | Albrecht | G05B 19/418 |

* cited by examiner

METHOD FOR SETTING UP A SECURE COMMUNICATION CONNECTION, A COMMUNICATION DEVICE AND CONNECTION CONTROLLER

BACKGROUND OF THE INVENTION

1. Field of the Invention

The present invention relates to a method for setting up a secure communication connection, a communication device and a connection controller.

2. Description of the Related Art

Industrial automation systems are used to monitor, control and regulate technical processes, in particular in the field of production, process and building automation, and make it possible to operate control devices, sensors, machines and industrial installations in a manner that is intended to be as independent as possible and independent of human interventions. On account of the continuously increasing importance of information technology for automation systems comprising numerous networked control or computer units, methods for reliably providing functions distributed over an automation system to provide monitoring, controlling and regulating functions are becoming increasingly important.

Interruptions in communication connections between computer units of an industrial automation system or automation devices may result in undesirable or unnecessary repetition of transmission of a service request. As a result, additional utilization of communication connections of the industrial automation system are caused, which may result in further system disruptions or faults. In addition, messages that have not been transmitted or have not been completely transmitted may prevent an industrial automation system from changing to or remaining in a safe operating state, for example. This may ultimately result in failure of a complete production installation and in a costly production standstill. A particular problem regularly results in industrial automation systems from message traffic with comparatively numerous but relatively short messages, thus intensifying the above problems.

EP 1 770 458 A2 describes an industrial automation system having at least one programmable logic control unit in which a configuration unit for configuring the control unit and for announcing its availability to a communication network is provided. Here, the configuration unit allocates a unique communication network address, which may be an IPv6 address, for example, to the control unit. The control unit can be automatically activated in this manner.

Earlier published European patent application EP 14171757.9 discloses a method for allocating communication network addresses for network subscribers of a segmented network having a plurality of subnetworks. The subnetworks are each connected, via a subnetwork router, to a collection network that interconnects them. Here, the subnetwork routers determine a common address space in a decentralized manner by interchanging router messages distributed over the collection network, and communication network addresses for the network subscribers are stipulated inside the address space.

Changes to communication network addresses as part of "network renumbering" in IPv6 communication networks, in particular, constitute fundamentally provided operations. In addition, IPv6 communication devices can simultaneously manage a plurality of assigned communication network addresses that each have a defined lifetime. In the case of an existing secure connection between a communication device inside an industrial communication network and a communication device outside the industrial communication network, a change in a communication network address of one of the two communication devices may result in a temporary interruption that may entail further disruptions.

SUMMARY OF THE INVENTION

It is therefore an object of the present invention to provide an apparatus and method for setting up a secure communication connection, which enables substantially continuous operation in the event of changes to communication network addresses during existing connections.

This and other objects and advantages are achieved in accordance with the invention by a communication device, a connection controller and a method, where in accordance with the method for setting up a secure communication connection to a communication device connected to an industrial automation system, a secure communication connection is set up between a first communication device and a second communication device via a non-secure first subnetwork. Here, the second communication device is additionally connected to a secure second subnetwork which is assigned to the industrial automation system. A monitoring unit assigned to the second communication device checks whether a new communication network address assigned to the second communication device for a connection to the first subnetwork becomes valid.

In accordance with the invention, in the event of a change in the communication network address assigned to the second communication device for the connection to the first subnetwork and in the case of a still existing secure communication connection between the first and second communication devices, the monitoring unit transmits an address change notification to the first communication device via the existing secure communication connection. Upon receiving an address change notification, the first communication device initiates the set-up of an additional secure communication connection between the first and second communication devices via the first subnetwork. The existing and additional secure communication connections may be a virtual private network tunnel, for example. The first communication device concludes a changeover from the existing secure communication connection to the additional secure communication connection as soon as the additional secure communication connection has been set up and established. This makes it fundamentally possible to ensure a smooth changeover.

In accordance with a preferred embodiment of the method in accordance with the invention, the second subnetwork is secured with respect to impermissible data traffic by the second communication device. For example, the second communication device may be a gateway. In addition, the second communication device may be integrated in an industrial automation device or may be implemented via a computer unit.

The communication network address assigned to the second communication device is preferably an IPv6 address. In this case, the monitoring unit transmits the address change notification to the first communication device in the event of an IPv6 prefix change. In particular, the monitoring unit may transmit the address change notification to the first communication device in the event of network renumbering. A frequent application for IPv6 address changes is therefore covered.

In an advantageous embodiment of the method in accordance with the invention, the monitoring unit transmits the address change notification to a tunnel controller assigned to the first communication device. The tunnel controller preferably initiates the set-up of the additional secure communication connection in the event of a new communication network address of the second communication device that is included in the address change notification. In accordance with another embodiment of the present invention, the tunnel controller destroys the previously existing secure communication connection following the changeover to the additional secure communication connection. The consistent and reliable connection changeover is therefore ensured.

It is also an object of the invention to provide a communication device that is connectable to an industrial automation system and is intended to implement the method in accordance with the disclosed embodiments. The communication device comprises at least two communication network connections for connection to a non-secure first subnetwork and to a secure second subnetwork which is assigned to the industrial automation system. In addition, a monitoring unit is provided and is configured and set up to check whether a new communication network address assigned for a connection to the first subnetwork becomes valid. In this case, the monitoring unit is additionally configured and set up, in the event of a change in the communication network address assigned for a connection to the first subnetwork and in the case of a still existing secure communication connection to a further communication device connected to the first subnetwork, to transmit an address change notification to the further communication device via the existing secure communication connection.

It is also an object of the invention to provide a connection controller for the communication device which is complementary to the communication device in accordance with the disclosed embodiment, and is configured and set up to initiate the setting-up of a secure communication connection between a first communication device and a second communication device via a non-secure first subnetwork. In this case, the second communication device is additionally connected to a secure second subnetwork that is assigned to an industrial automation system. In addition, the connection control unit is configured and set up, upon receiving an address change notification for the second communication device, to initiate the set-up of an additional secure communication connection between the first and second communication devices via the first subnetwork. In addition, the connection control unit is configured and set up to conclude a changeover from the existing secure communication connection to the additional secure communication connection as soon as the additional secure communication connection has been set up and established.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is described in more detail below using an exemplary embodiment with reference to the drawings, in which.

DETAILED DESCRIPTION OF THE EXEMPLARY EMBODIMENTS

Figure 1:
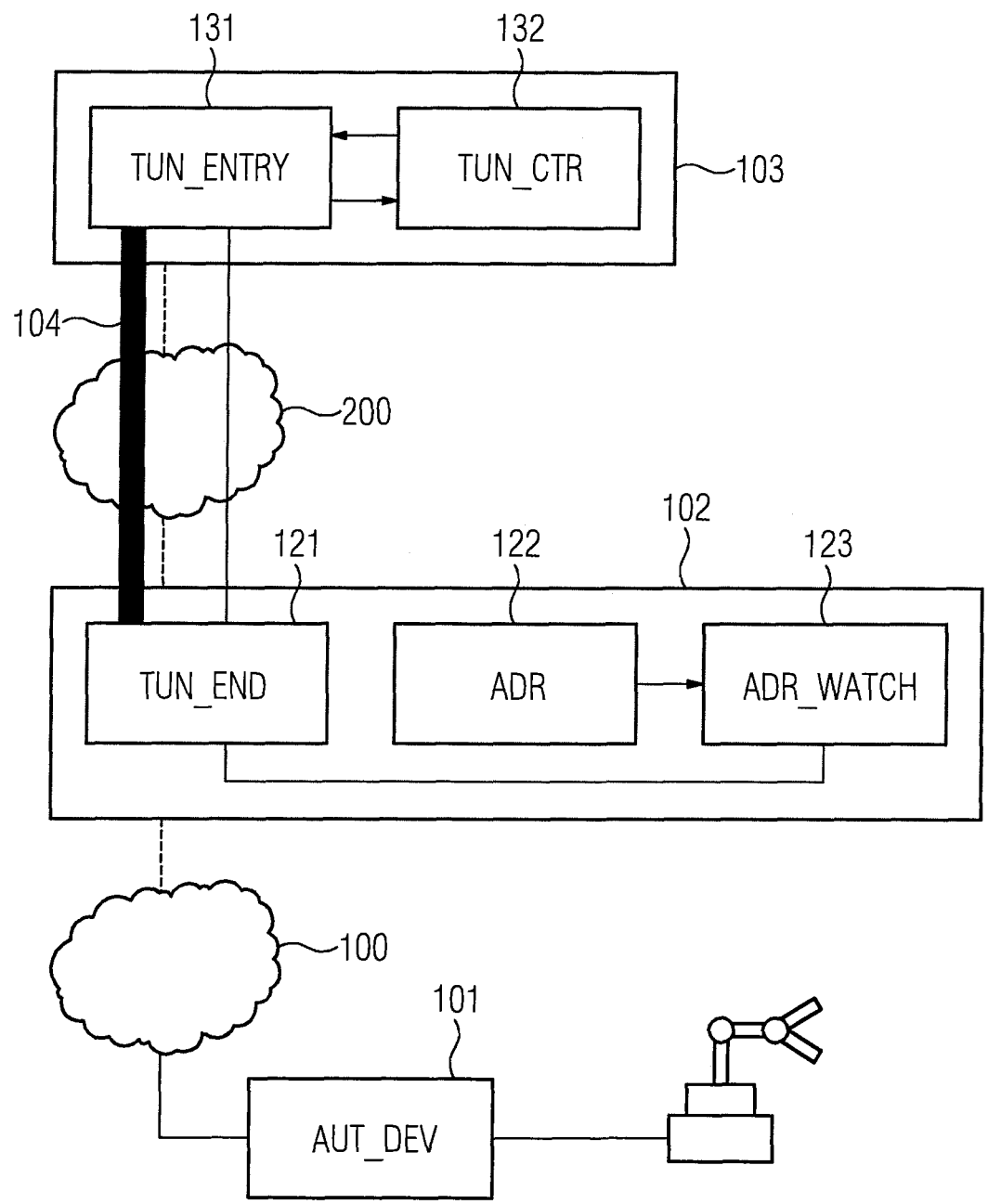
FIG. 1 shows an industrial automation system having an engineering system as the starting point of a VPN connection and having a gateway of an industrial communication network as the end point of the VPN connection.

The industrial automation system illustrated in FIG. 1 comprises at least one engineering system 103 for planning and monitoring automation devices, a gateway 102 of an industrial communication network 100 and an exemplary automation device 101. The engineering system 103 and the gateway 102 are interconnected via a non-secure first subnetwork 200. In the present exemplary embodiment, the non-secure first subnetwork 200 is the Internet. In contrast, the industrial communication network 100, via which the gateway 102 and the automation device 101 are connected to one another, is a secure second subnetwork.

In the present exemplary embodiment, the automation device 101 comprises a communication unit and may be, for example, a programmable logic controller or a field device. The gateway 102 secures the industrial communication network 100 with respect to impermissible data traffic. The gateway 102 may be integrated in an industrial automation device or may be implemented via a computer unit, for example.

At least one virtual private network (VPN) connection 104 is set up between the engineering system 103 and the gateway 102 as a secure communication connection via the non-secure first subnetwork 200. In this case, a tunnel entry point 131 is assigned to the engineering system 103, while the gateway 102 comprises a tunnel end point 121. A monitoring unit 123 assigned to the gateway 102 continuously checks whether a new communication network address 122 assigned to the gateway 102 for a connection to the first subnetwork 200 becomes valid.

In the event of a change in a communication network address 122 assigned to the gateway 102 for a connection to the first subnetwork 200 and in the case of a still existing secure communication connection 104 between the engineering system 103 and the gateway 102, the monitoring unit 123 transmits an address change notification to a tunnel controller 132 assigned to the engineering system 103 via the existing secure communication connection 104. Upon receiving an address change notification or a new communication network address 122 of the gateway 102, the tunnel controller 132 initiates the set-up of an additional secure communication connection between the engineering system 103 and the gateway 102 via the first subnetwork 200. The engineering system 103 concludes a smooth changeover from the existing secure communication connection 104 to the additional secure communication connection as soon as the additional secure communication connection has been set up and established. In this case, the tunnel controller 132 destroys the previously existing secure communication connection following the changeover to the additional secure communication connection.

In the present exemplary embodiment, the communication network addresses 122 assigned to the gateway 102 are IPv6 addresses. In this case, the monitoring unit 123 transmits address change notifications to the engineering system 103, in particular in the event of IPv6 prefix changes. This can be implemented as part of network renumbering, for example.

Overall, two new elements are provided in accordance with the present exemplary embodiment, i.e., the monitoring unit 123 on the side of the gateway 102 and the tunnel controller 132 on the side of the engineering system 103. The monitoring unit 123 detects and monitors IPv6 addresses allocated to the gateway 102 and notifies the tunnel controller 132 of address changes. In the event of address changes, the tunnel controller 132 initiates the set-up of a new VPN connection and destroys the previous VPN connection 104.

Overall, the two new elements in accordance the present exemplary embodiments provide the following advantages: (i) smooth VPN tunnel operation with changing IPv6 prefixes and therefore changing IPv6 addresses, (ii) no waiting times before newly allocated addresses become visible in a domain name system (DNS) following address changes; instead, immediate changeover is possible without resorting to the DNS, and (iii) operation possible with provider aggregatable (PA) IPv6 addresses; no need for provider independent (PI) IPv6 addresses.

Figure 2:
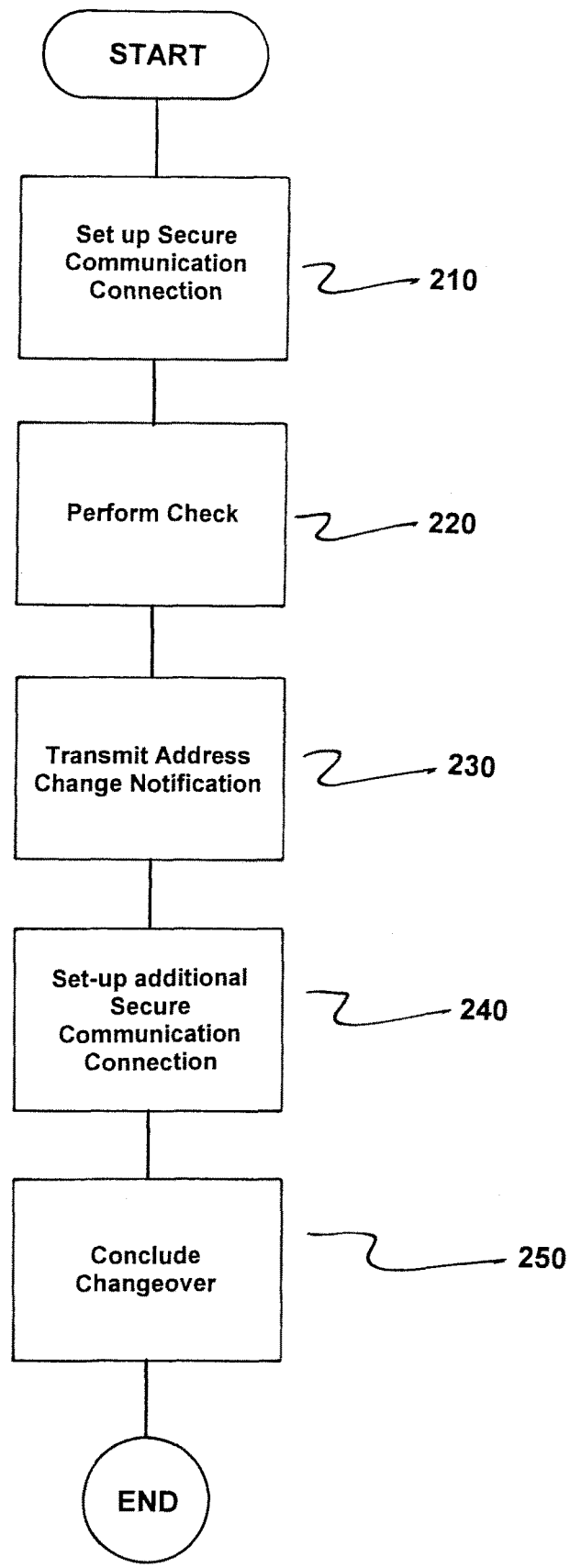
FIG. 2 is a flowchart of the method in accordance with the invention.

FIG. 2 is a flowchart of a method for setting up a secure communication connection to a communication device connected to an industrial automation system.

The method comprises setting up a secure communication connection between a first communication device and a second communication device via a non-secure first subnetwork, as indicated in step 210. Here, the second communication device is additionally connected to a secure second subnetwork assigned to the industrial automation system.

Next, a monitoring unit assigned to the second communication device checks whether a new communication network address assigned to the second communication device for a connection to the first subnetwork becomes valid, as indicated in step 220.

The monitoring unit now transmits an address change notification to the first communication device via the existing secure communication connection in an event of a change in a communication network address assigned to the second communication device for a connection to the first subnetwork and when a still existing secure communication connection between the first and second communication devices is present, as indicated in step 230.

The first communication device then initiates a set-up of an additional secure communication connection between the first and second communication devices via the first subnetwork upon receiving the transmitted address change notification, as indicated in step 240.

The first communication device now concludes a changeover from the existing secure communication connection to the additional secure communication connection as soon as the additional secure communication connection is set up and established, as indicated in step 250.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for setting up a secure communication connection to a communication device connected to an industrial automation system, comprising:
    setting up a secure communication connection between a first communication device and a second communication device via a non-secure first subnetwork, the second communication device additionally being connected to a secure second subnetwork assigned to the industrial automation system;
    checking, by a monitoring unit assigned to the second communication device, whether a new communication network address assigned to the second communication device for a connection to the first subnetwork becomes valid;
    transmitting by the monitoring unit an address change notification to the first communication device via the existing secure communication connection in an event of a change in a communication network address assigned to the second communication device for a connection to the first subnetwork and when a still existing secure communication connection between the first and second communication devices is present;
    initiating, by the first communication device, a set-up of an additional secure communication connection between the first and second communication devices via the first subnetwork upon receiving the transmitted address change notification; and
    concluding, by the first communication device, a changeover from the existing secure communication connection to the additional secure communication connection as soon as the additional secure communication connection is set up and established.

2. The method as claimed in claim 1, wherein the second subnetwork is secured with respect to impermissible data traffic by the second communication device.

3. The method as claimed in claim 2, wherein the second communication device is a gateway.

4. The method as claimed in claim 1, wherein the second communication device is integrated in an industrial automation device or is implemented via a computer unit.

5. The method as claimed in claim 2, wherein the second communication device is integrated in an industrial automation device or is implemented via a computer unit.

6. The method as claimed in claim 3, wherein the second communication device is integrated in an industrial automation device or is implemented via a computer unit.

7. The method as claimed in claim 1, wherein the communication network address assigned to the second communication device is an IPv6 address, and wherein the monitoring unit transmits the address change notification to the first communication device in an event of an IPv6 prefix change.

8. The method as claimed in claim 7, wherein the monitoring unit transmits the address change notification to the first communication device in an event of network renumbering.

9. The method as claimed in claim 1, wherein at least one of the existing and additional secure communication connection is a virtual private network tunnel.

10. The method as claimed in claim 1, wherein the monitoring unit transmits the address change notification to a tunnel controller assigned to the first communication device.

11. The method as claimed in claim 10, wherein the tunnel controller initiates the set-up of the additional secure communication connection in the event of a new communication network address of the second communication device which is included in the address change notification.

12. The method as claimed in claim 10, wherein the tunnel controller destroys the previously existing secure communication connection following the changeover to the additional secure communication connection.

13. The method as claimed in claim 11, wherein the tunnel controller destroys the previously existing secure communication connection following the changeover to the additional secure communication connection.

\* \* \* \* \*